US009369299B2

(12) United States Patent
Dupont et al.

(10) Patent No.: US 9,369,299 B2
(45) Date of Patent: Jun. 14, 2016

(54) NETWORK ACCESS CONTROL SYSTEM AND METHOD FOR DEVICES CONNECTING TO NETWORK USING REMOTE ACCESS CONTROL METHODS

(75) Inventors: Eric P. Dupont, Nashua, NH (US); Seshakrishnan Srinivasan, Newmarket, NH (US); Frank D. Andrus, Sanbornton, NH (US)

(73) Assignee: BRADFORD NETWORKS, INC., Concord, NH (US)

( * ) Notice: Subject to any disclaimer, the term of this patent is extended or adjusted under 35 U.S.C. 154(b) by 1454 days.

(21) Appl. No.: 12/481,801

(22) Filed: Jun. 10, 2009

(65) Prior Publication Data

US 2009/0307753 A1   Dec. 10, 2009

Related U.S. Application Data

(60) Provisional application No. 61/060,208, filed on Jun. 10, 2008.

(51) Int. Cl.
*G06F 7/04* (2006.01)
*H04L 12/28* (2006.01)
*H04L 29/06* (2006.01)

(52) U.S. Cl.
CPC ........ *H04L 12/2872* (2013.01); *H04L 12/2876* (2013.01); *H04L 63/0272* (2013.01); *H04L 63/08* (2013.01)

(58) Field of Classification Search
CPC .............. H04L 29/06823; H04L 63/10; H04L 12/2461; H04L 63/107; H04L 29/06551
USPC .......................................................... 726/3
See application file for complete search history.

(56) References Cited

U.S. PATENT DOCUMENTS

| | | | |
|---|---|---|---|
| 6,678,826 B1 * | 1/2004 | Kelly et al. ...................... 726/2 |
| 7,272,625 B1 * | 9/2007 | Hannel et al. ................. 709/200 |
| 2005/0273853 A1 | 12/2005 | Oba et al. |
| 2007/0006282 A1 * | 1/2007 | Durham et al. ................... 726/2 |
| 2007/0192867 A1 * | 8/2007 | Miliefsky ........................ 726/25 |
| 2008/0155656 A1 * | 6/2008 | Agosta et al. ..................... 726/3 |
| 2009/0150977 A1 * | 6/2009 | Carley .............................. 726/3 |
| 2009/0158302 A1 * | 6/2009 | Nicodemus et al. .......... 719/328 |
| 2010/0043066 A1 * | 2/2010 | Miliefsky .......................... 726/9 |
| 2011/0072135 A1 * | 3/2011 | Hannel et al. ................. 709/225 |

OTHER PUBLICATIONS

Symantec, White Paper: Endpoint Security, 2007, Symantec, pp. 2-22.*
Bradford Networks Inc., "Campus Manager, Out-of-Band Network Access Control for Wireless, Wired and VPN Networks", Jan. 30, 2008, 4 pages.

* cited by examiner

*Primary Examiner* — Esther B Henderson
(74) *Attorney, Agent, or Firm* — Maine Cernota & Rardin

(57) ABSTRACT

A system and method for network access control (NAC) of remotely connected devices is disclosed. In embodiments, agents support role mapping and policy-based scanning. Embodiments automatically perform authentication, assessment, authorization, provisioning, and remediation. Capabilities include user authentication, role-based authorization, endpoint compliance, alarms and alerts, audit logs, location-based rules, and policy enforcement. Processes collect information about the user as well as the host being used from sources including, but not limited to, LDAP, the remote access device, and the agent. Once this data has been obtained, embodiments construct a comprehensive model of the host. This model is subsequently used to govern the actual host's network access when it connects to the network. Passive monitoring includes vulnerability scanning to control access rights throughout the duration of the connection.

22 Claims, 14 Drawing Sheets

(NETWORK ACCESS CONTROL ARCHITECTURE)

(OPERATIONAL STAGES / PHASES)

(RAD NACS RADIUS AUTHENTICATION PROCESS)

(ROLE CHECK)

(DEVICE IDENTIFICATION / AUTHORIZATION)

(PROCESS FLOW FOR DISSOLVABLE AGENT)

(SCAN)

(SCAN SUCCESS)

(POST-CONNECT MONITORING)

(REMOTE ACCESS PROCESS FLOW)

(REMOTE ACCESS PROCESS FLOW)

(REMOTE ACCESS PROCESS FLOW)

(REMOTE ACCESS PROCESS FLOW)

NETWORK ACCESS CONTROL SYSTEM AND METHOD FOR DEVICES CONNECTING TO NETWORK USING REMOTE ACCESS CONTROL METHODS

RELATED APPLICATION

This application claims the benefit of U.S. Provisional Application No. 60/060,208 filed Jun. 10, 2008, incorporated herein by reference in its entirety for all purposes.

FIELD OF THE INVENTION

The invention relates to computer communications security, in particular, network access control (NAC) and its use for securing networks by controlling the access of electronic devices connecting to those networks using remote access connection methods such as Virtual Private Networks or Dialup services.

BACKGROUND OF THE INVENTION

Computer communications commonly involve multiple connection methods including dedicated, directly wired networks, dial-up, wireless, and virtual private networks (VPN). This increases the need for and complexity of network access control and security.

NAC hardware solutions often employ a network appliance inline with the network to provide NAC capabilities, sometimes in conjunction with access layer switches. NAC applications should be able to integrate with technologies such as intrusion detection, vulnerability assessment, and identity management. NAC admission scenarios can include go/no-go access, virtual LAN (VLAN)-based access controls, simple packet filters, and stateful firewalling. There are also known IEEE 802.1x quarantine methods. Existing solutions rely solely on user authentication to determine network access. Management and control of both remote access users and devices is important to protect the internal network by ensuring devices meet the policy requirements of a particular company network and that network services are provisioned appropriately for a device.

What is needed is a network access control system that provides authentication, assessment, authorization, provisioning, and remediation, for a broad, user-centric, network-based, access control solution.

SUMMARY OF THE INVENTION

Embodiments provide a system for network access control supporting remote access connection methods including VPN and dialup. Embodiments work in conjunction with other integrated local area network access methods including wired access methods and wireless access methods to provide a single, consistent user experience. Embodiments of the system utilize access control lists (ACLs), domain name system (DNS), persistent and dissolvable subdetecting agents, with policies by identity and network point of access that give "out of band edge enforcement". Embodiments leverage security capabilities of existing network equipment along with authentication and authorization technologies to control network access down to the point of access. Embodiments include web interface tools to create and manage connection profiles. Connection profiles encompass username, role, hostname, device or host IP, host MAC address(es), host security policy, network access device, port and/or network device access policy, and time—any combination of which can be used to provide detailed identification of users and hosts connected to a network and associated network devices. Policies can be enforced on a host regardless of how it attempts to access the network, and both an authenticated user and host can be restricted by role independently. Embodiments offer both persistent and dissolvable agents that run on a connecting host to perform assessments of host's condition. Agents exist for multiple operating systems. The results indicate the host's level of security policy compliance which determines if network access will be granted, or the required remediation services for out-of-compliance devices. Automation of the processes of authentication, assessment, authorization, and remediation, embodiments offers a broad, user-centric, network-based, access control solution.

Embodiments perform authentication, assessment, authorization, and offer support for remediation. Capabilities include 1) User authentication, 2) Role-based authorization, 3) Endpoint compliance, 4) Alarms and alerts, 5) Audit log, 6) Location-based rules, and 7) Policy enforcement.

Embodiments include a system for out-of-band control of network access supporting multiple connections comprising a network; at least one remote access device (RAD) communicatively coupled to the network; and a Network Access Control Server (NACS) controlling the network access, wherein the network access control comprises identity management of the connections; endpoint compliance of the connections; and usage policy enforcement of the connections. For further embodiments, the network access comprises agents whereby the agents collect identity and health information about the user and the RAD. In another embodiment, the network access comprises at least one of a Virtual Private Network (VPN) server, Remote Access Server (RAS), firewall, intrusion protection detection system, a switch, a router, an authentication authorization and accounting (AAA) directory server, Bootstrap Protocol (BOOTP), Dynamic Host Configuration Protocol (DHCP), and Domain Name System (DNS). In yet another embodiment, the network access comprises a connection attempt comprising constructing a connection model from information about the user and the RAD. For one embodiment, the network access control is RAD agnostic and the connections comprise at least one network capable connecting user device. In other embodiments, identity management comprises role management, wherein users are assigned roles corresponding to access control characteristics specific to each RAD in the network; and identity management comprises scan policy based on identity and location of the connecting user and the RAD. For embodiments, the network access of the connecting user device is controlled by filters based on identity and location of the connecting user and the RAD; and the network address of the RAD is unchanged as the security condition of the RAD changes, whereby transition between restricted and unrestricted is automatic to the user. In yet other embodiments, the usage policy enforcement comprises data recording whereby security threat analysis and regulatory compliance reports are generated, and at-risk device access comprises an automatic remediation option.

Embodiments also include a method for secure network access of a user device to a network comprising the steps of receiving a connect attempt to the network from the user device; authenticating the connecting user to a network access control server (NACS) by a remote access device (RAD); capturing RAD identification, location by the NACS; restricting access to the network by the user device with a network access filter (NAF) configured on the RAD; directing the client device to an agent by the RAD; running the agent on the user device; identifying the client to the NACS by the agent; modifying the NAF based on compliance; monitoring post-connection of successful connections. For another embodiment, the authenticating step comprises an authentication authorization and accounting (AAA) server. In other embodiments, the NACS instructs the RAD to reject user and the network connection is disallowed when authentication fails; and the step of restricting access follows successful authentication. For one embodiment, the step of running the agent comprises scanning by scan policy based on user and location. For further embodiments, identity management comprises constructing a model of the connecting user device from data gathered by the agent; and the step of modifying the NAF comprises maintaining the NAF whereby network access is restricted if results from the scanning fail compliance. In yet other embodiments, the step of modifying the NAF comprises client remediation when results from the scanning fail compliance; and modifying the NAF comprises the NACS instructing the RAD to modify the NAF. For one embodiment, the step of identifying the client includes information about the user and the user device. For one other embodiment, the step of monitoring post-connection of successful connections comprises continued access, designating client marked at-risk, disabling, or disconnecting based on results of the monitoring wherein the monitoring is passive.

Yet other embodiments include a method for secure network access of a user device to a network comprising the steps of attempting to connect to the network from the user device; authenticating the connecting user to a network access control server (NACS) by a remote access device (RAD), wherein the authentication process is out of band, and not involved in ongoing network traffic flow, whereby data throughput and remote access scalability are unimpeded; capturing RAD identification, location by the NACS, wherein role-mapping based on user identity and RAD provides identity-based network assignment; restricting access to the network by the user device with a network access filter (NAF) configured on the RAD, wherein network access restrictions by filter are abstracted whereby a plurality of RAD filtering mechanisms are supported; directing the client device to an agent by the RAD, wherein the agent is determined by the NACS; running the agent on the user device, wherein the agent is selected from persistent and dissolvable agents; identifying the client to the NACS by the agent; modifying the NAF based on compliance; and monitoring post-connection of successful connections.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

Among the benefits provided by embodiments of the invention are location & identity based access control and scan policy, host identity (complete with the MAC addresses of all the network adapters), and the identity of the user who is connected to the remote host. It also operates with a captive portal for forced agent download. It restricts/allows access to network based on identity and health check, it is remote access device (RAD) agnostic (a multi-vendor solution), and provides out-of-band access control (it is not in the network data path).

Terms used in this application are described below.

access control lists (ACLs)—Collections of network access rules that govern how a remote access device processes network traffic.

access policy—Collection of properties including access rules used to govern remote host connections.

agent—A software application that executes on the remote device to provide the NACS with data describing that device. Agents can also be used to enforce policy.

(vendor)-agnostic—The state of being unaffected by the manufacturer of network devices being managed in the network.

authentication—The process of identifying and validating a user who is actively using a network device to connect to a network.

authenticated user—A user who is connected to a network and has been identified with a specific network device.

authorization—The process of providing specific network access based on the identity of a user or network device.

dissolvable agent—An agent that is installed on a remote device to run only once after which it removes itself from the device.

edge enforcement—Enforcing network access at the point of access to the network rather than at some internal network interface.

host—A device used to connect to a network.

host identity—Information about a host used to identify it and distinguish it from other hosts.

network devices—Any device in a network whose primary purpose is to enable the network and form part of its construction.

(network) point of access—The logical or physical point at which a network device attaches to a network. This can be a port on a switch or a wireless SSID for local connections, or a modem or VPN interface for remote access connections.

out of band—Used to convey something that is not in the direct path of a process.

persistent agent—An agent that is installed on a remote device and remains on the device to provide data to NACS on an ongoing basis.

registration—The act of identifying a user as the owner of a connecting host.

remediation services—Services provided to allow network devices to access and/or run software products necessary to resolve their security compliance deficiencies.

remote access device (RAD)—A network device that allows remote devices to connect to a network through one of its interfaces.

role—A tag assigned to a network user or device used for creating a correlation between that user or device and a network device feature capable of controlling network access.

Figure 1:
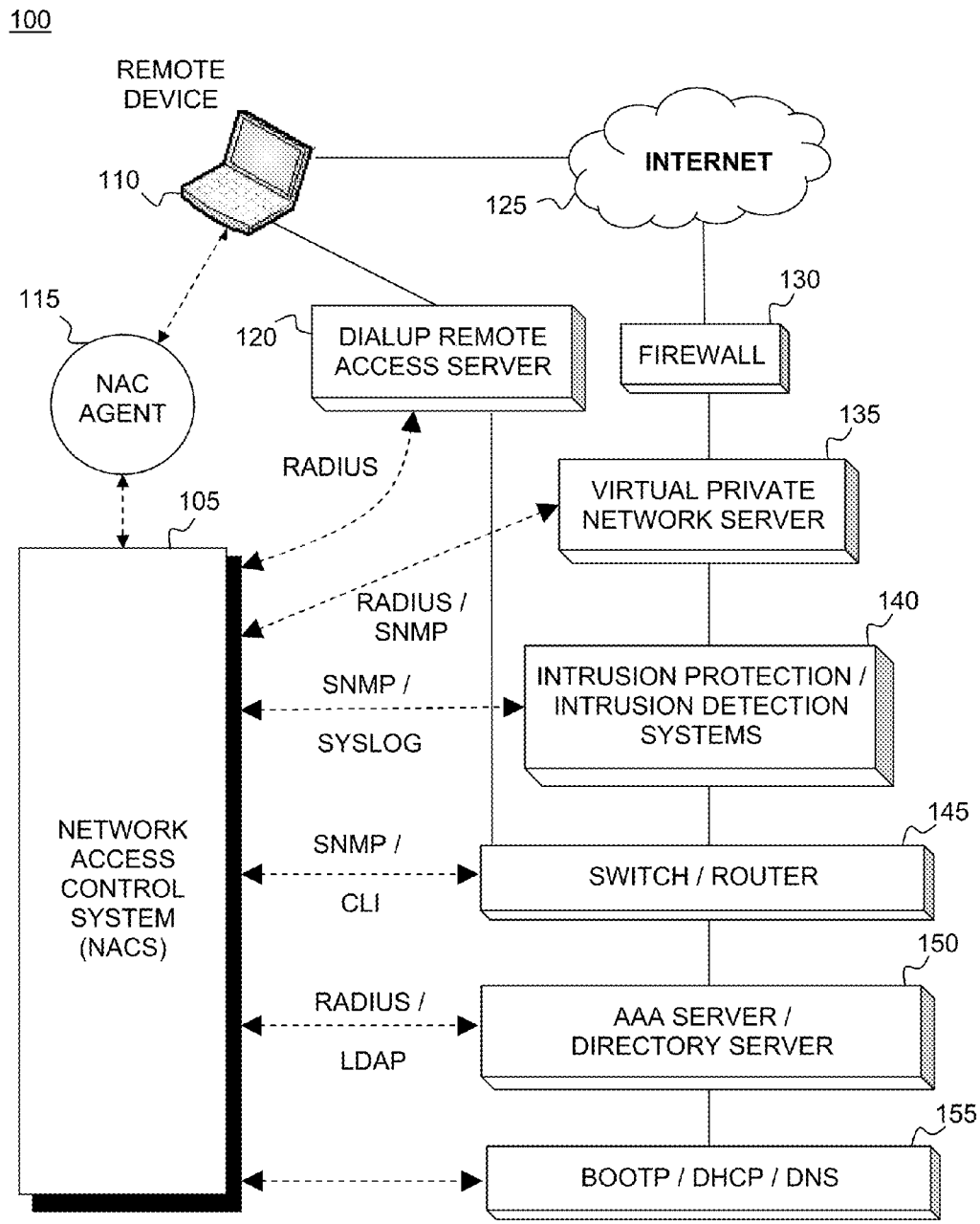
FIG. 1 is a top level block diagram illustrating a network access control architecture configured in accordance with one embodiment of the present invention.

FIG. 1 is a top level block diagram illustrating a network access control architecture embodiment 100. In this figure, dotted lines represent communication between elements and solid lines represent logical connections between elements. The elements may exist on separate systems or may be combined to coexist on systems in different combinations. Embodiments contain different combinations of elements, not all of which are necessary, dependent upon individual network designs. Basically, Network Access Control System (NACS) 105 supports multiple communication interfaces. Users 110 can connect to a private network from a remote client through a Virtual Private Network (VPN) over the internet 125 or through a dialup connection 120. Dialup Server 120 incorporates network elements including but not limited to switches and routers 145. In embodiments, internet access 125 can incorporate firewall 130, VPN server 135, intrusion protection/intrusion detection systems 140, switch/router 145, authentication, authorization and accounting (AAA) server 150, and Bootstrap Protocol (BOOTP)/Dynamic Host Configuration Protocol (DHCP)/Domain Name System (DNS) 155. VPN 135 and dialup remote access servers 120 use RADIUS to authenticate users to the NACS 105 which in turn may use RADIUS and Lightweight Directory Access Protocol (LDAP) to authenticate with AAA or directory Servers 150. Intrusion protection/intrusion detection systems 140 may use Simple Network Management Protocol (SNMP) traps or forward log messages (SYSLOG) in an IP network. Switch/router 145 and VPN 135 may also use SNMP traps to notify NACS of network events. NACS uses SNMP or CLI to VPN and switch/router for data gathering and control.

As mentioned, the NACS is vendor-agnostic. Embodiments of the remote access solution are designed to work with many different remote access devices and types. The methods employed to affect network restrictions through the use of filters are abstracted such that most types of filtering mechanisms supported on devices can be leveraged.

Figure 2:
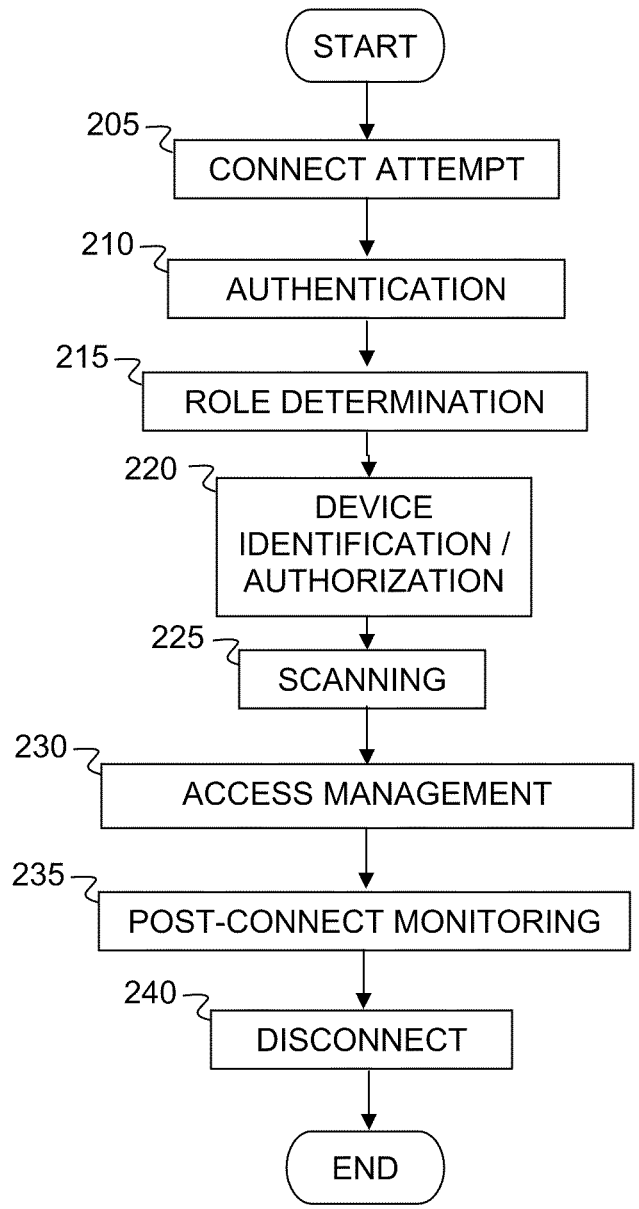
FIG. 2 is a simplified flow chart of operational stages configured in accordance with one embodiment of the present invention.

FIG. 2 is a simplified flow chart of operational stages 200 configured in accordance with one embodiment of the present invention. The process starts with a connect attempt 205, then authentication 210, role determination 215, device identification/authorization 220, scanning 225, access management 230, post-connect monitoring 235, and disconnect 240.

Embodiments provide location and identity-based control. They are able to control a user's access to the network based upon the identity of the connecting user and the location (specific remote access device) through which they are connecting to the managed network. Both the user identity and the access device are provided in a RADIUS authentication request.

Figure 3:
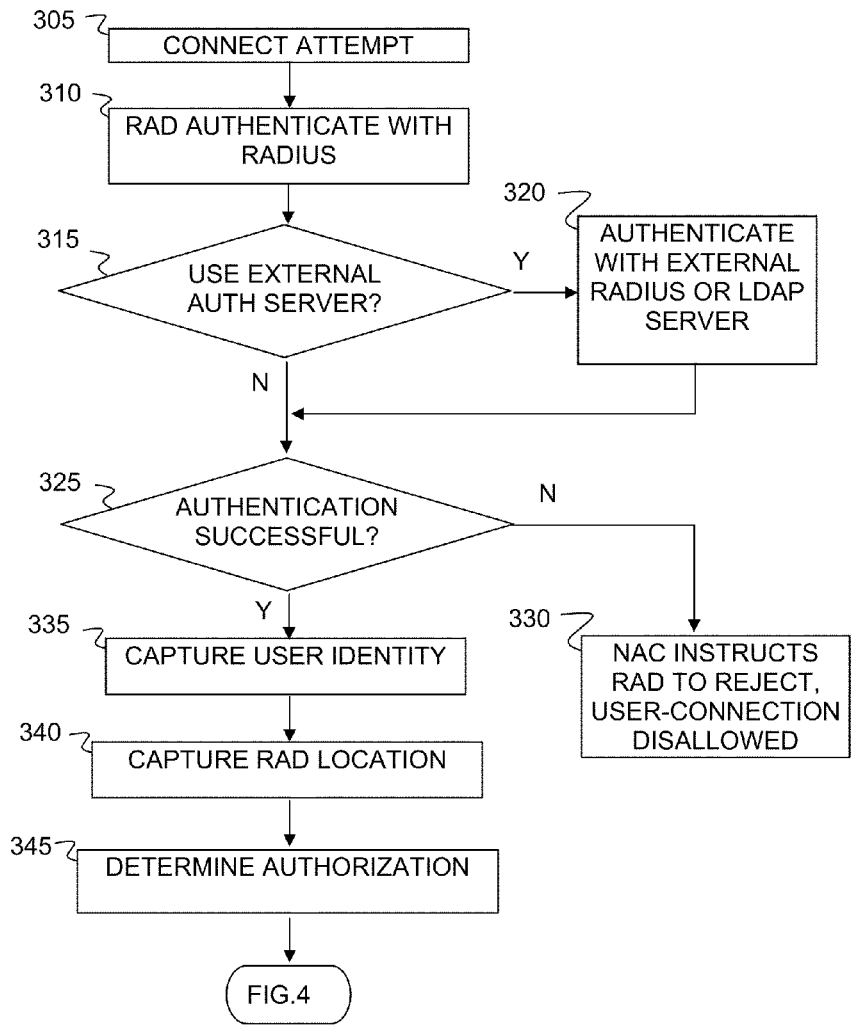
FIG. 3 is a simplified flow chart of an authentication process configured in accordance with one embodiment of the present invention.

FIG. 3 is a simplified flow chart of an authentication process embodiment 300 configured in accordance with one embodiment of the present invention. It comprises steps 205 and 210 of FIG. 2. Connection attempts 305 proceed to a remote access device (RAD) which authenticates connecting users to the Network Access Control System (NACS) using RADIUS 310. If configured to use an external authorization server 315, the NACS further authenticates the user with the external authentication server using RADIUS or LDAP 320. At authentication decision 325, if authentication 310 is unsuccessful, NACS instructs RAD to reject the attempt, and the user-connection is disallowed 330. If authentication 310 is successful 325, the process flows to capture user identity 335, capture RAD location 340, and determine authorization 345. The process continues to role check of FIG. 4. In each case, RADIUS is used to provide authentication for connecting users and to integrate RAD with NACS. It is not necessary for all users connecting through RAD to authenticate to NACS. However, for those that are configured to do so, there is a one to one correspondence of users to authentications (one per remote session), and each user will authenticate independently.

Hosts that connect to a managed network must be registered and authenticated before being granted access to a customer network. Registration is the act of identifying a user as the owner of a connecting host. Prior to this registration process, a connecting user is granted only restricted network access. The registration process collects information about the user as well as the actual host being used from several sources (including but not limited to LDAP, the remote access device, an executable program loaded and run on the connecting host (agent)). Once this data has been obtained, embodiments construct a comprehensive model of the host. Registration occurs at this time, with the authenticating user assigned ownership of the host. This model is subsequently used to govern the actual host's network access while it is connected to the network. Other users may subsequently connect remotely to the network using the same host and authenticate using their own credentials, but the host will remain owned by the first user, unless the host has been deleted from NACS.

Subsequently, each time a host connects to a managed network, the user of that host is forced to identify him/her. Further, the user must execute the agent on the host to identify the actual host machine prior to being granted access. By having collected the user and host information during the registration process, along with the information they collect at each connection instance, embodiments can determine both the host that is connecting to the network as well as the user who is using that host. Both the user and the host may have access restrictions placed on them by NACS to limit their network access. User and host access is logged for historical reporting purposes. As stated, the process continues to role check of FIG. 4.

Figure 4:
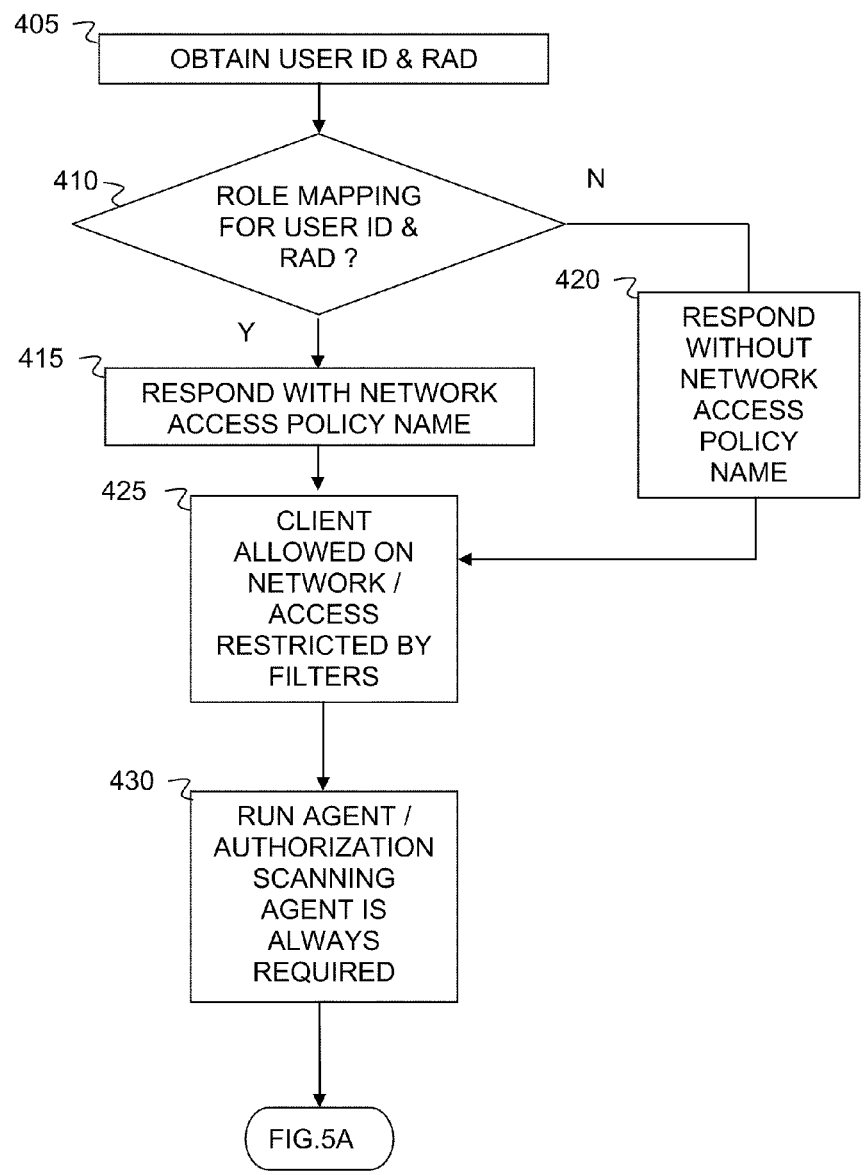
FIG. 4 is a simplified flow chart of role identification process and identity-based network assignment configured in accordance with one embodiment of the present invention.

FIG. 4 is a simplified flow chart depicting authentication process embodiment 400. Basically, from obtained user ID and RAD 405, role-mapping within the NACS for the user ID and RAD is checked 410. Role mapping is a feature that enables identity-based network assignment. If no mapping is found at 410, respond without a network access policy name 420 and continue to the step of allowing client on the network with access restricted by default filters 425 configured on the RAD. Filters can take different forms and the actual manifestation is determined by the specific RAD. If mapping is found at 410, respond with network access policy name 415, and client is allowed on the network designated by a specific network access policy with access restricted by filters 425 defined by the policy. Next, agent/authorization scanning is run 430 as the process continues to Agent Authorization of FIG. 5A. Note that agent execution on the host is always required during the connection process for the purpose of identifying the host machine. The agent may also optionally scan the host machine to determine its level of compliance to a NACS administrator defined security policy.

Role determination and authorization is optional. The NACS can be configured to assign a role to a user or host depending on directory parameters defined for the user. Furthermore, a role that does become assigned to a user or host must also be configured within the NACS to correspond to a particular network assignment policy for each individual RAD. Assuming these configuration steps have occurred, role determination and authorization involves a two step process: 1) the role effects a network access policy assignment that occurs after authentication but before authorization. The user must be granted a minimal level of network access in order to either obtain an agent or to allow its existing agent to contact the NACS; and 2) the decision to change the ACLs/filters on a session is made after the agent has been run and has identified the actual host machine (and optionally its security compliance posture).

Embodiments restrict/allow access to network based on identity and security compliance. As described, network filters are employed on an admitting remote access device to limit a user's network access until an agent can be run to identify the connecting host along with its current security compliance. Once the host's identity and security compliance are learned and found acceptable, the restrictive filters can be removed. Conversely, if a host's compliance status changes after its filters have been removed, the filters can be reapplied or the host can be disconnected from the network. Hosts that do not run an agent remain unidentified and continue to operate with restricted access to the network, since the filters governing their access are not removed.

The role management feature allows users to be assigned to roles which can correspond to access control characteristics that are specific to each remote access device in the network. If role management is not exercised, network access is governed by global default parameters that are configured in the NACS. If no global default parameters are defined, network access is governed by the configuration on the RAD.

Figure 5A:
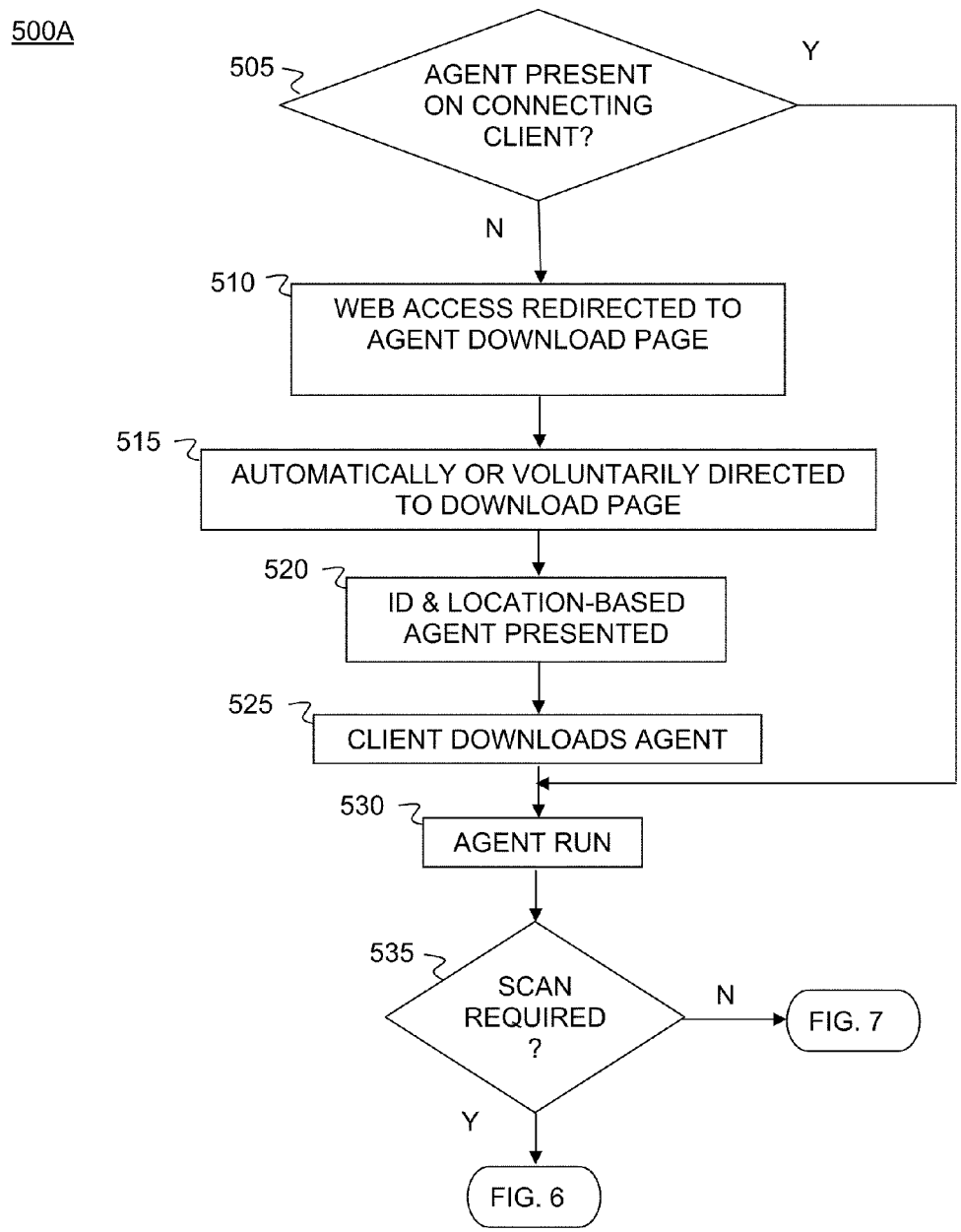
FIG. 5A is a simplified flow chart of an agent authorization process configured in accordance with one embodiment of the present invention.

FIG. 5A is a simplified flow chart of a device identification/authorization process embodiment 500A. There is a check for an agent present on connecting client 505. If yes, agent running on the client attempts to communicate to the NACS and the NACS also attempts to communicate to the agent 530. If no agent is detected on the client, web access is redirected to an agent download page 510. Web requests are directed to a web page where the agent can be downloaded 515. The agent download page automatically delivers the agent that is appropriate for the client based on the type of network access being used 520, and the client downloads an agent 525. Following agent download 525, agent is run 530. Based on the user identity, the NACS determines what scan is required and sends the agent the proper scan profile 535. If no scan is required, the process continues to the steps of FIG. 7. If a scan is required, the process continues to the steps of FIG. 6.

Embodiments provide a captive portal for forced agent download. Some embodiments require voluntary navigation to the captive portal in situations using VPN where it is desirable to allow the connecting client to maintain local network address resolution simultaneously with remote connectivity. Embodiments of agents are used to collect information about hosts on which they are run. This information is used to identify the host as well as its security compliance posture in order to determine if it should be granted access to the customer's network. In order to ensure that connecting users are able to locate and download an agent, the remote access solution employed by embodiments uses DNS assignment along with network filters to redirect the http access of newly connected users to captive portal web pages that are hosted by embodiments of the invention and provide the agents for downloading. This process ensures that the agents, whose execution is required for network admittance, can be easily and conveniently accessed and executed.

Figure 5B:
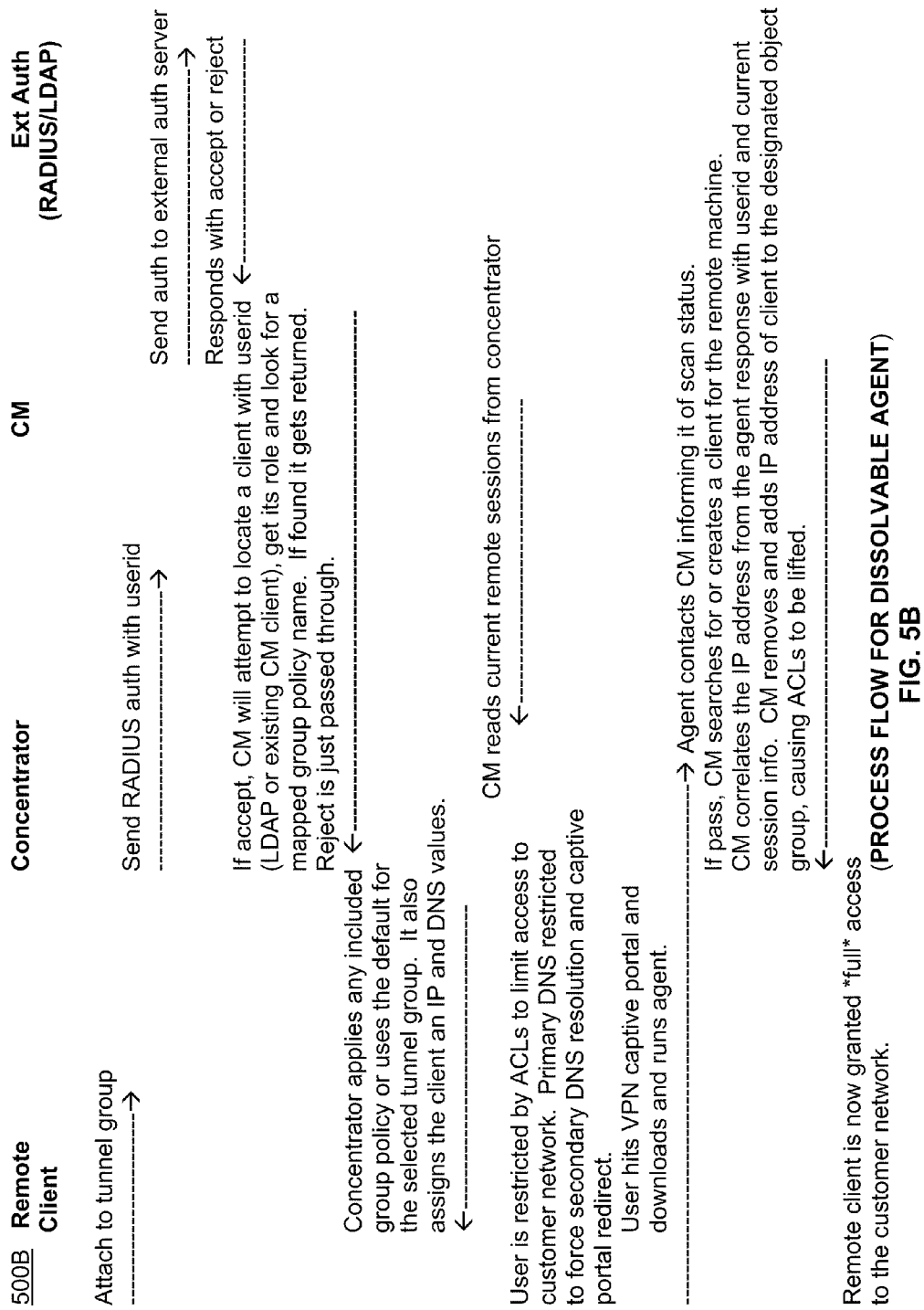
FIG. 5B is a simplified process flow for a dissolvable agent configured in accordance with one embodiment of the present invention.

FIG. 5B is a depiction 500B of a simplified process flow for a dissolvable agent configured in accordance with one embodiment of the present invention.

Figure 5C:
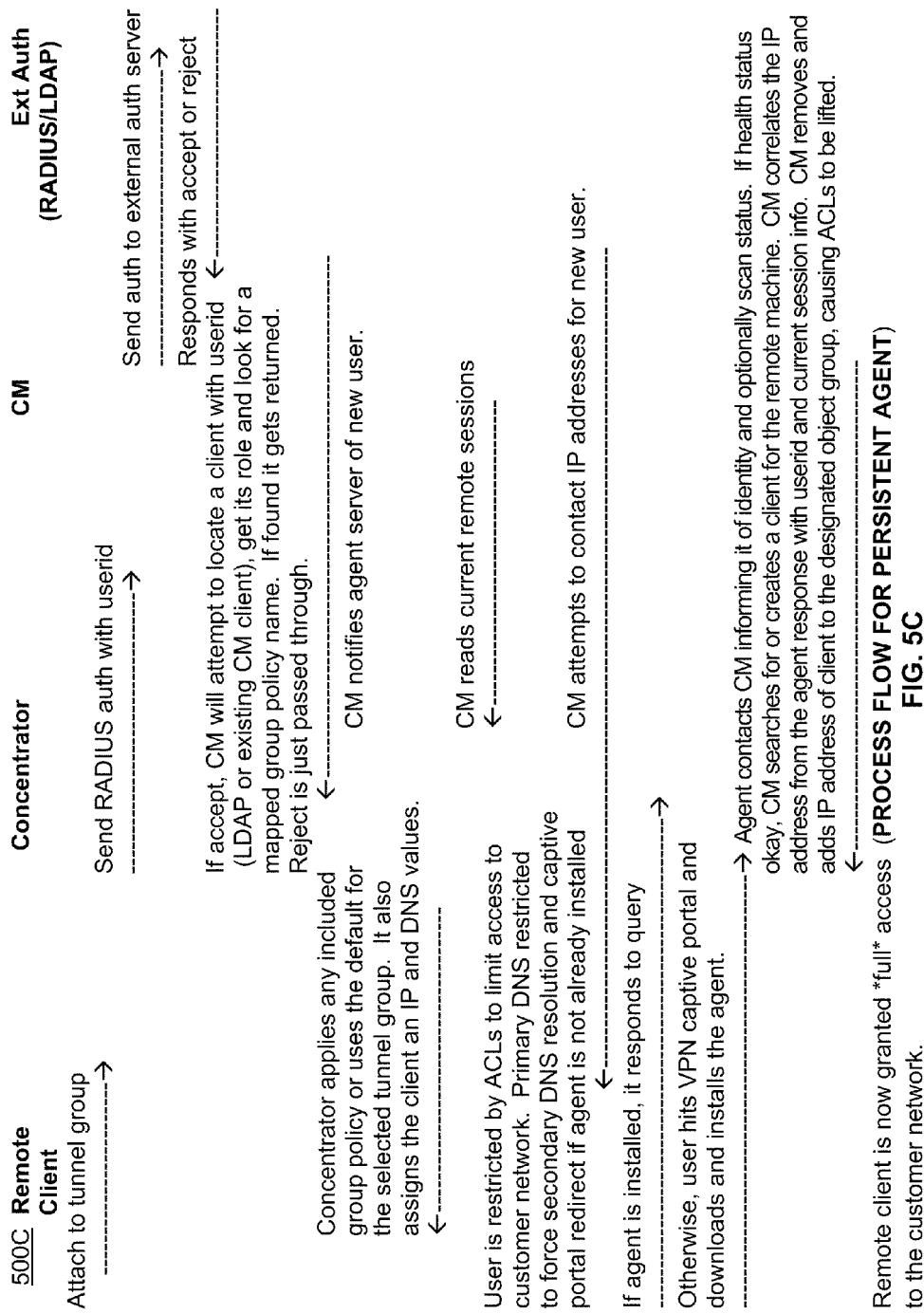
FIG. 5C is a simplified process flow for a persistent agent configured in accordance with one embodiment of the present invention.

FIG. 5C is a depiction 500C of a simplified process flow for a persistent agent configured in accordance with one embodiment of the present invention.

Figure 6:
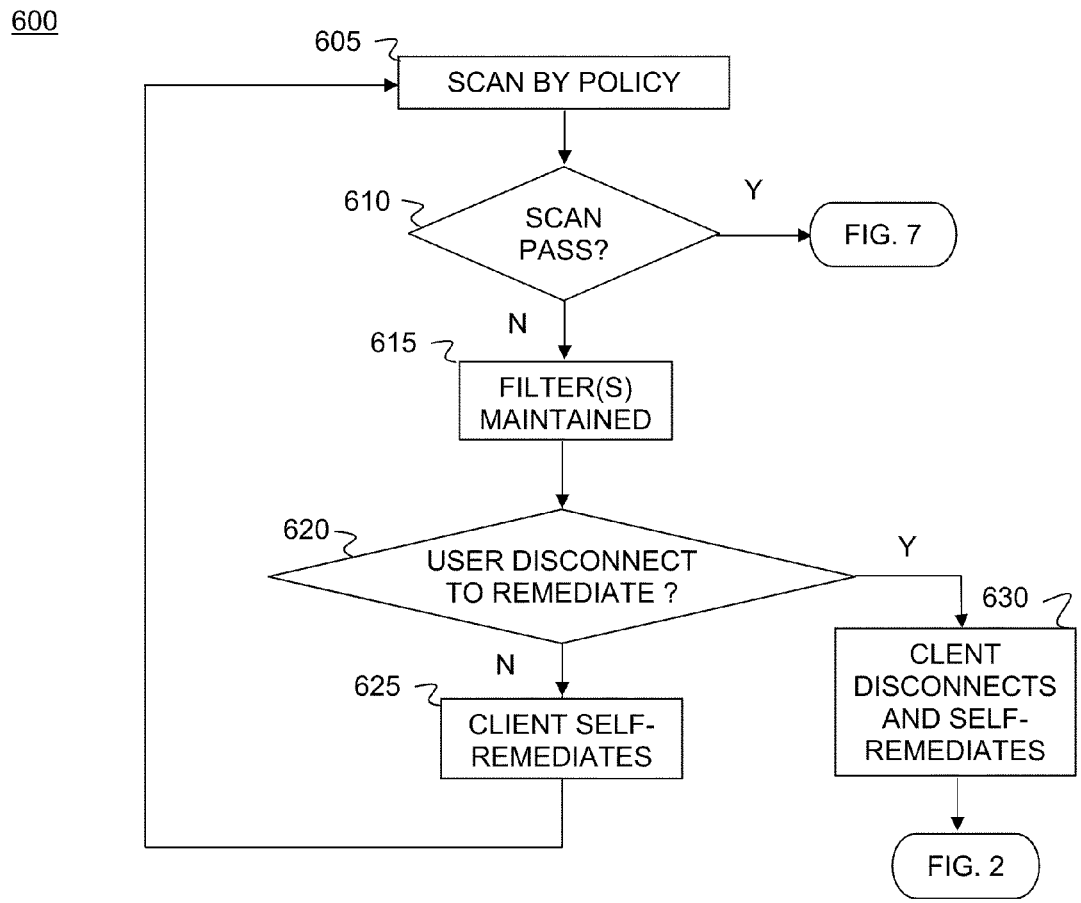
FIG. 6 is a simplified flow chart of a scan process configured in accordance with one embodiment of the present invention.

FIG. 6 is a simplified flow chart of a scan process embodiment 600. Basically, beginning with scanning by policy 605, if the scan outcome 610 is PASS, proceed to the steps of FIG. 7. If the scan outcome 610 is FAIL, restrictive filter(s) are retained 615 and the user must remediate. Users must PASS scan policy to have the restrictive filters affecting their session removed. Users may be required 620 to disconnect to remediate 630 or remediate from the restricted network while still connected 625. Once remediation is complete, user returns to scanning by policy step 605. If the user does disconnect to remediate, he then returns to the steps of FIG. 2 with another connect attempt.

Embodiments select a scan policy based on location and identity. Meaning, they can control scan policies that are applied to connecting users based on their identity and location (specific remote access device) through which they are connecting to the managed network. Scan policies applied to hosts connecting to the network are chosen based on a number of criteria: the specific remote access device to which the connecting remote host is connecting and the identity of the user connecting to the network. The NACS are configured by the administrator to either allow self-remediation of the host while it remains connected to the enterprise network or have the host disconnect prior to self-remediation.

Figure 7:
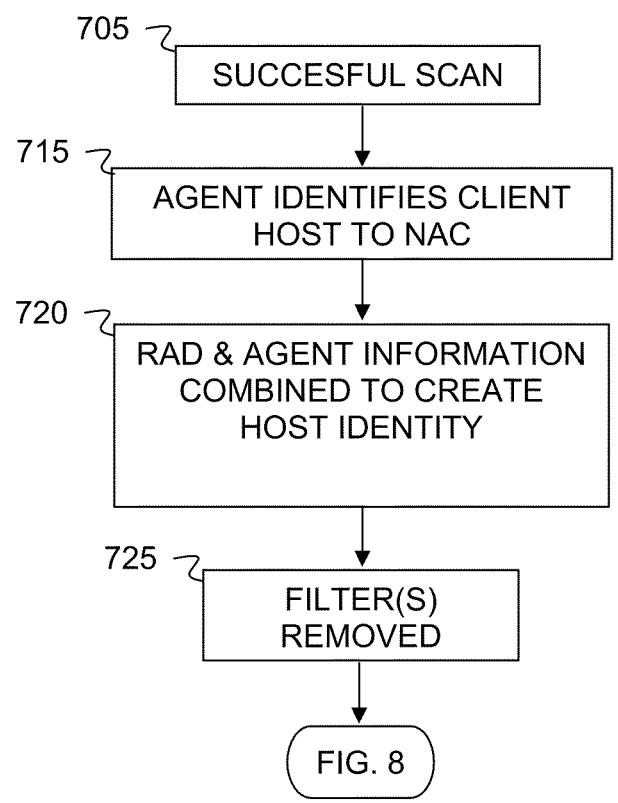
FIG. 7 is a simplified flow chart of a successful scan process configured in accordance with one embodiment of the present invention.

FIG. 7 is a simplified flow chart of an embodiment of steps 700 subsequent to a successful scan process. A successful scan 705 is accompanied by host characteristics that identify the client host to NACS. 715. RAD & agent information is combined to create a host identity 720. NACS commands the RAD to remove the filters for the affected session 725 and the process continues to post-connect monitoring of FIG. 8.

Figure 8:
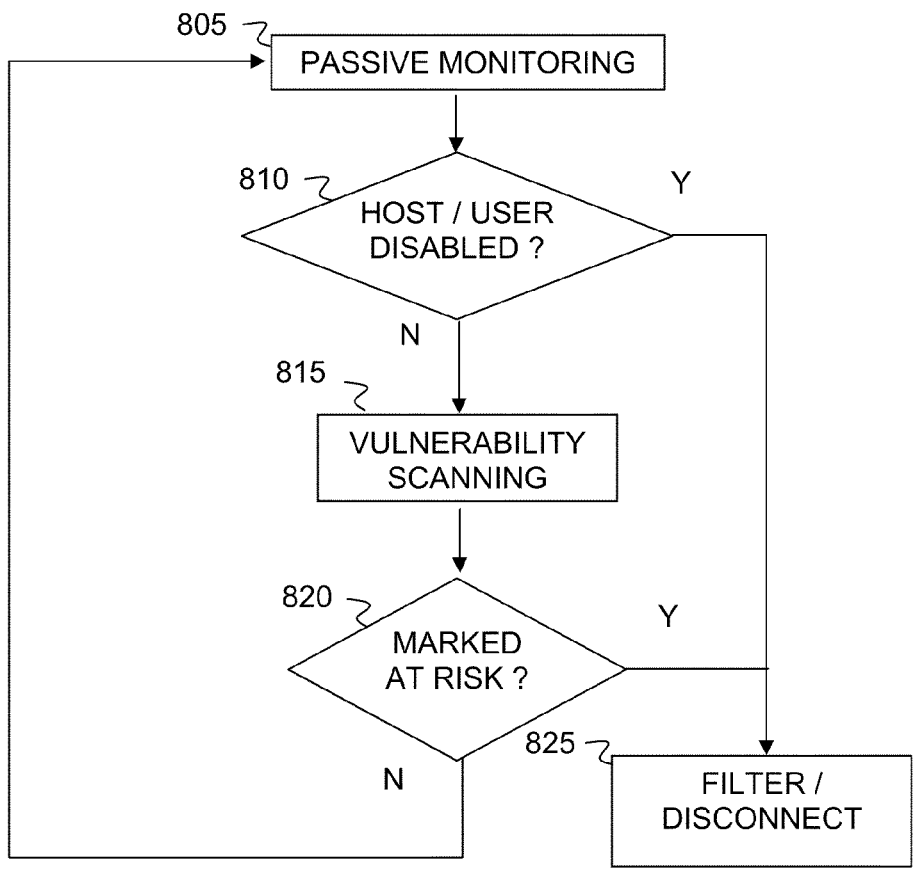
FIG. 8 is a simplified flow chart of post-connect monitoring configured in accordance with one embodiment of the present invention.

FIG. 8 is a simplified flow chart of an embodiment of post-connect monitoring 800. Passive monitoring 805 determines the client state 810 within NACS and involves optional periodic vulnerability scanning 815 where a client may be marked at-risk 820. If a client is marked at risk, it may be disconnected or have filters reapplied to its session 825. Again, if a client fails a security compliance scan or is found to be disabled 810, it proceeds to be filtered or disconnected 825. Users and client machines may be disabled manually by a NACS administrator or may be disabled based on the violation of a policy being enforced by an Intrusion Detection System (IDS)/Internet Provider Security (IPS), flow or packet analysis tool, or other network security equipment. If a client remains compliant and is not in a disabled state, the NACS returns to passively monitoring the clients 805.

A simple, fluid, connection process is supported by embodiments of the invention. As a user and host are identified during the connection process, a host progresses through various stages. Each stage is mapped to one of three possible conditions, which determine whether or not a host will be 1) restricted in its network access, 2) unrestricted in its network access, or 3) disconnected from the network. As the host's condition moves from unknown or uncompliant to compliant, their network address remains constant, so their transition from restricted to unrestricted access is transparent to the user.

Embodiments provide out-of-band access control (not in the network data path). While components of embodiments of the application are used during the authentication process for connecting remote access users, once a host is connected, it is not involved in the normal network traffic flow for that host. Therefore, it does not become a bottleneck for data throughput removing impact on remote access scalability.

FIGS. 9A through 9D present a simplified flow chart depicting an embodiment of remote access process flow 900A-900D. Operations previously explained are included as components of this overall view.

Figure 9A:
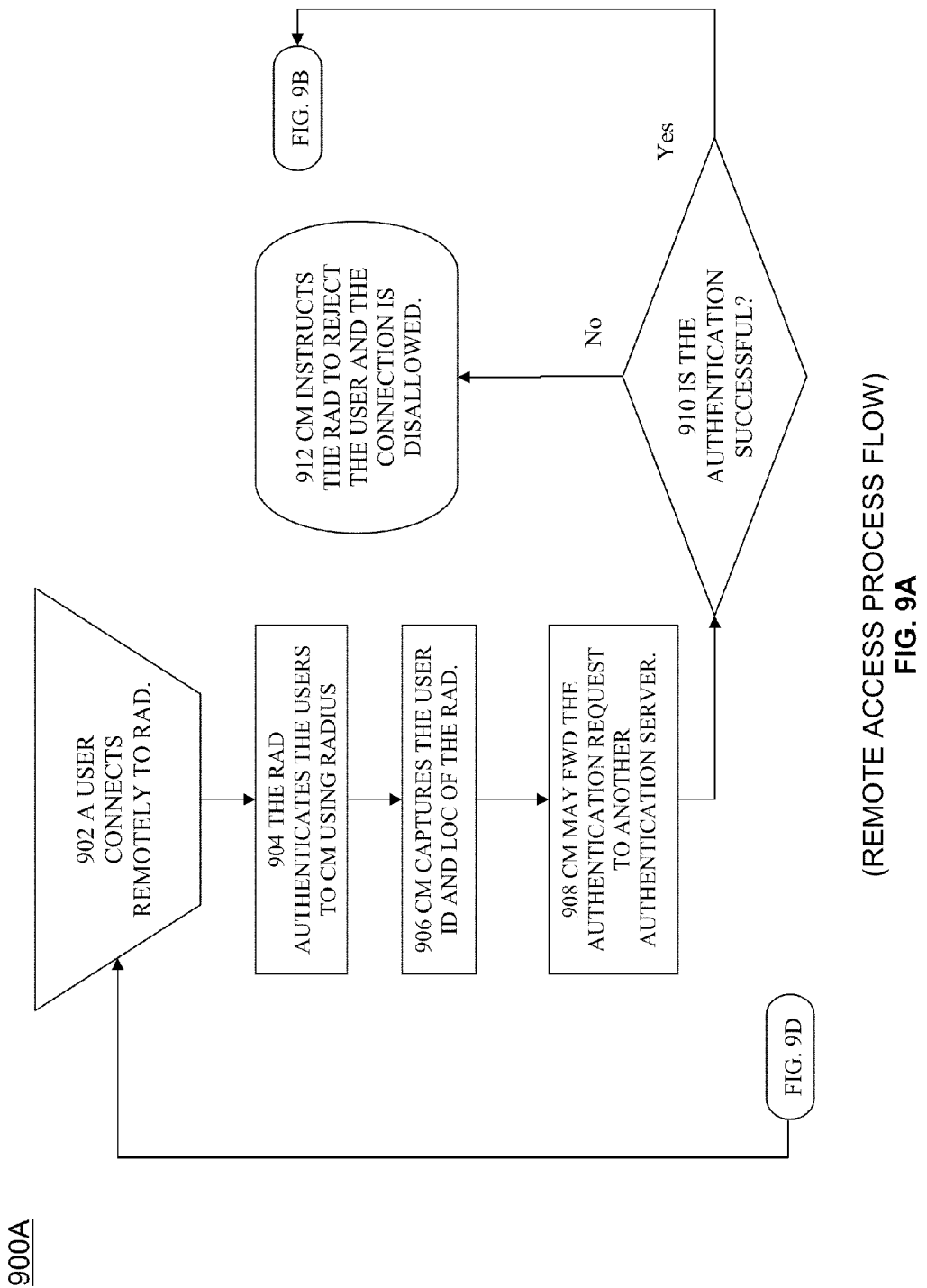
FIG. 9A-D is a simplified flow chart of a remote access process flow configured in accordance with one embodiment of the present invention.
Figure 9B:
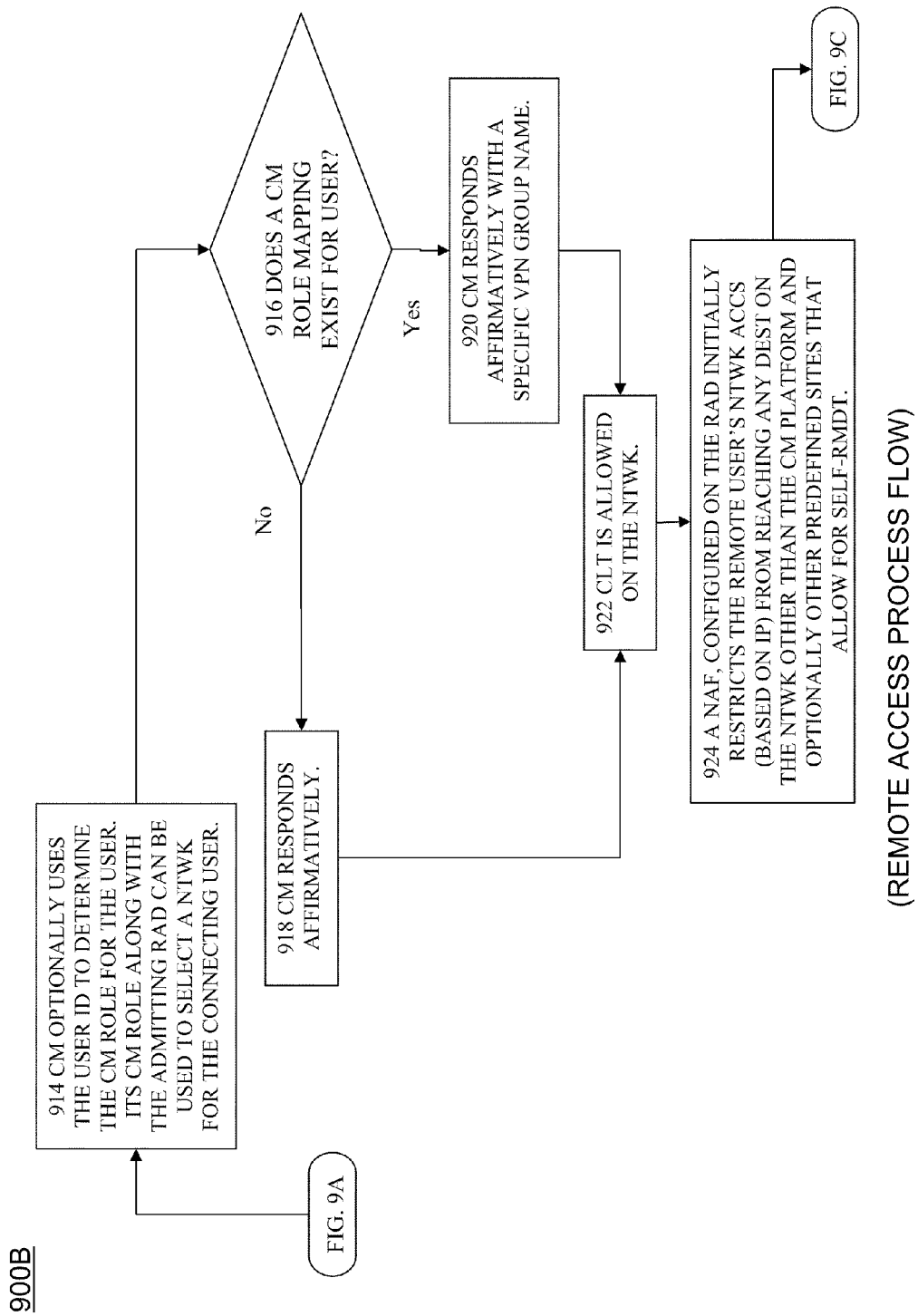

Steps of FIG. 9A comprise 902 a user connects remotely to RAD; 904 the RAD authenticates the users to Campus Manager (CM) using RADIUS; 906 CM captures the user ID and location of the RAD; 908 CM may forward the authentication request to another authentication server; 910 next, is the authentication successful?; if no, 912 CM instructs the RAD to reject the user and the connection is disallowed and then to 914 of FIG. 9B.

Steps of FIG. 9B comprise 914 CM optionally uses the user ID to determine the CM role for the user. Its CM role along with the admitting RAD can be used to select a network for the connecting user; 916 does a CM role mapping exist for user?; if no, 918 CM responds affirmatively and then to 922. If yes, 920 CM responds affirmatively with a specific VPN group name; 922 Client is allowed on the network; 924 a NAF, configured on the RAD initially restricts the remote user's network access (based on IP) from reaching any destination on the network other than the CM platform and optionally other predefined sites that allow for self-remediation and then to 926 of FIG. 9C.

Figure 9C:
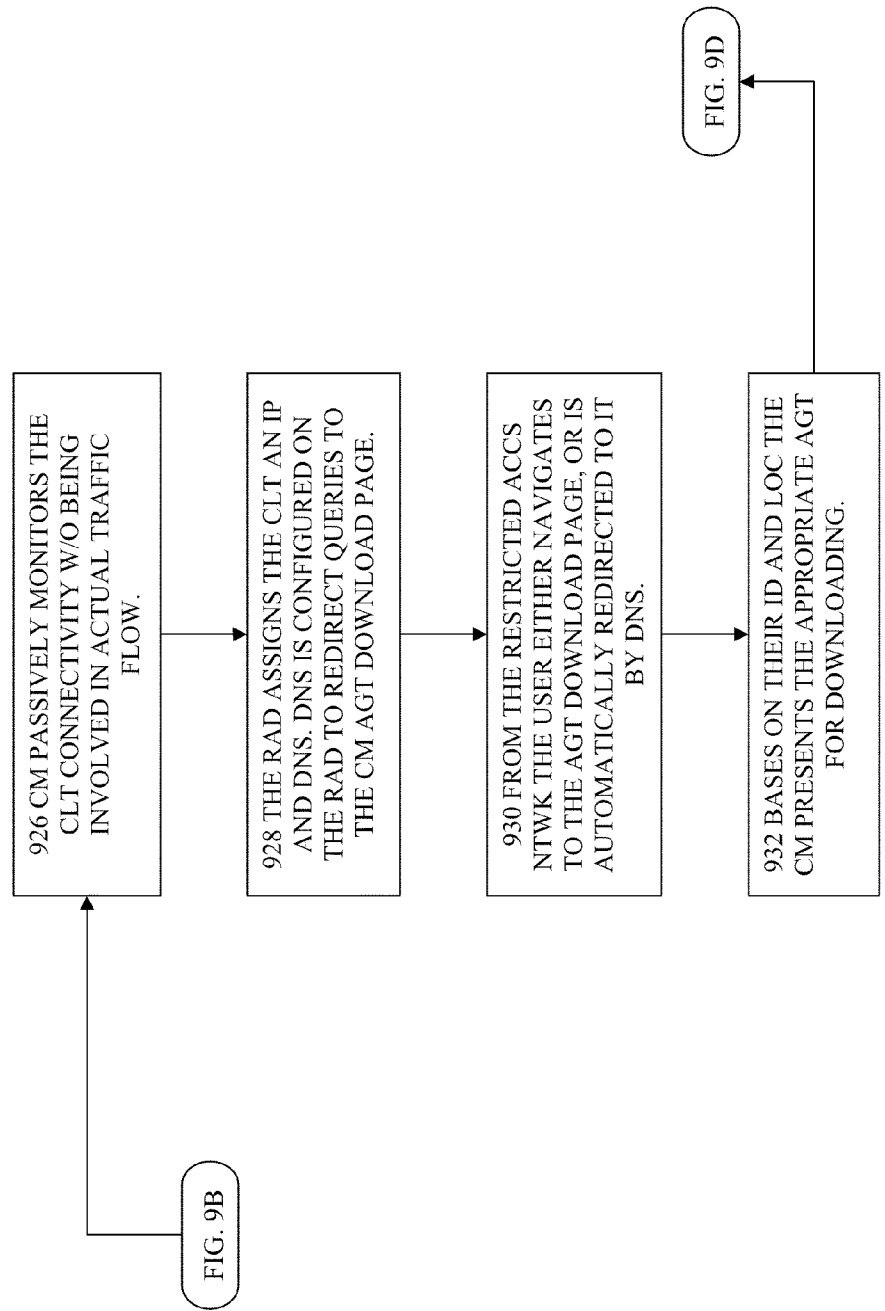

Steps of FIG. 9C comprise 926, CM passively monitors the client connectivity w/o being involved in actual traffic flow; 928 the RAD assigns the client an IP and DNS. DNS is configured on the RAD to redirect queries to the CM agent download page; 930 from the restricted access network the user either navigates to the agent download page, or is automatically redirected to it by DNS; 932 based on their ID and location, the CM presents the appropriate agent for downloading and then to 934 of FIG. 9D.

Figure 9D:
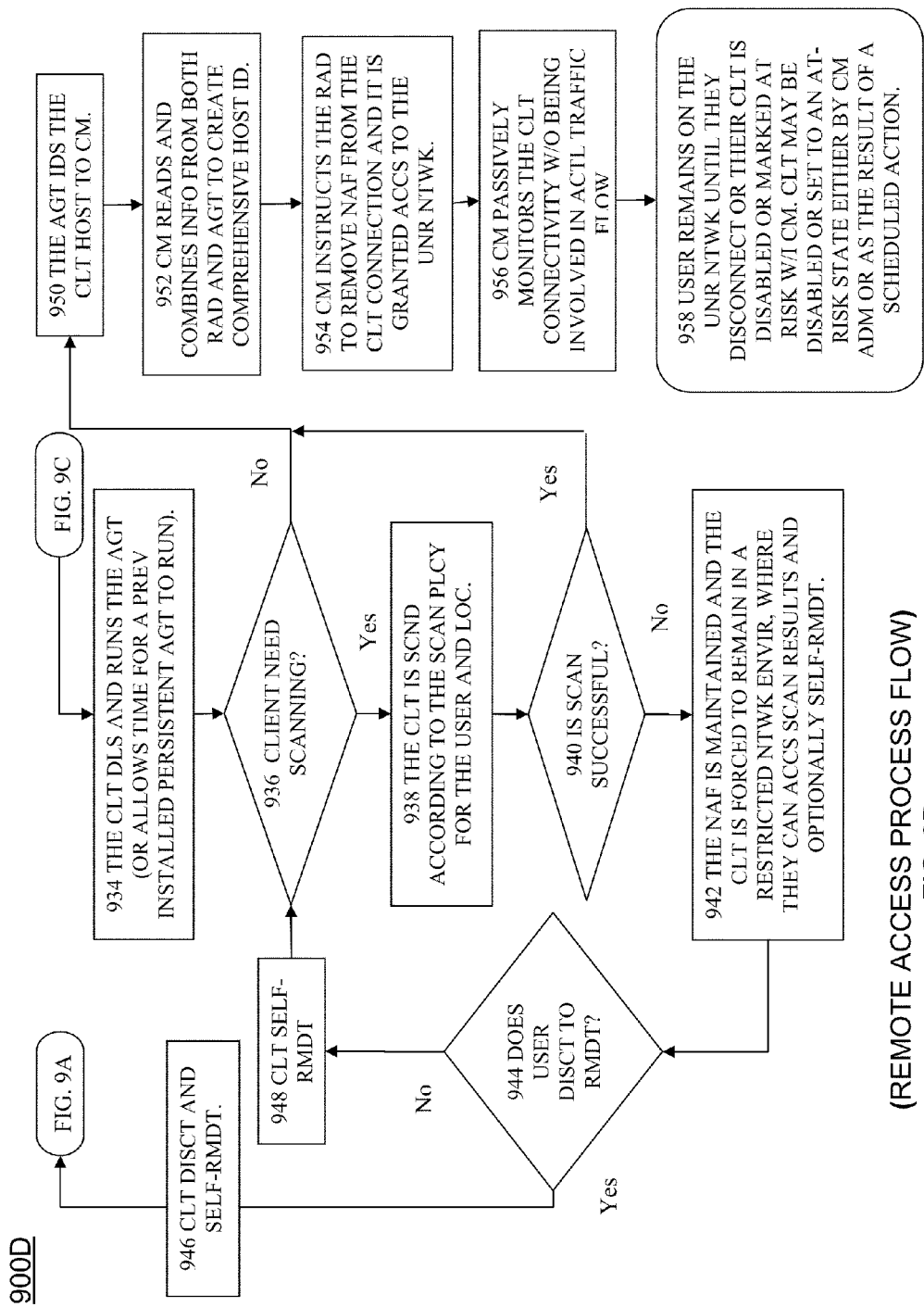

Steps of FIG. 9D comprise 934 the client downloads and runs the agent (or allows time for a previously installed persistent agent to run); 936 client need scanning?; if Yes, 938 the client is scanned according to the scan policy for the user and location; if no, to 950. From 938 to 940 is scan successful?; if yes, to 950; if no, 942 the NAF is maintained and the client is forced to remain in a restricted network environment, where they can access scan results and optionally self-remediate; 944 does user disconnect to remediate?; if yes, 946 client disconnects and self-remediates and then to 902 of FIG. 9A; if no, 948 client self-remediates and to 936. From step 950 the agent identifies the client host to CM; to 952 CM reads and combines information from both RAD and agent to create a comprehensive host ID; 954 CM instructs the RAD to remove NAF from the client connection and it is granted access to the unrestricted network; 956 CM passively monitors the client connectivity w/o being involved in actual traffic flow; 958 user remains on the unrestricted network until they disconnect or their client is disabled or marked at risk within CM. Client may be disabled or set to an at-risk state either by CM administrator or as the result of a scheduled action.

In embodiments of the Network Access Control System (NACS), the connection process flow proceeds as a user connects remotely to the remote access device (RAD). The RAD authenticates the user to the NACS using RADIUS. The NACS captures the user identity along with the RAD to which the client machine is connecting. The NACS may forward the authentication request to another authentication server.

If the authentication is successful, the NACS responds affirmatively, and allows the client on the network. The NACS optionally uses the user identity to determine the NACS role for the user. Its NACS role along with the admitting RAD can be used to select a network for the connecting user. A network access filter (NAF), configured on the RAD initially restricts the remote user's network access (based on IP) from reaching any destination on the network other than the NACS platform and optionally other predefined sites that allow for self-remediation.

The NACS passively monitors the client connectivity without being involved in actual traffic flow. The RAD assigns the client an IP and DNS. DNS is configured on the RAD to redirect queries to the NACS agent download page. From the restricted access network, the user either navigates to the agent download page, or is automatically redirected to it by DNS.

Based on their identity and location, the NACS presents the appropriate agent for downloading. The client downloads and runs the agent (or allows time for a previously installed persistent agent to run). If the agent is scheduled to scan the client, the client is scanned according to the scan policy for the user and location.

The agent identifies the client host to the NACS. Once client is identified, and optional scan indicates compliance with policy, NACS instructs the RAD to remove NAF from the client connection and it is granted access to the unrestricted network.

The NACS passively monitors the client connectivity without being involved in actual traffic flow. The user remains on the unrestricted network until they disconnect or their client is disabled or marked at risk within NACS. Clients may be disabled or set to an at-risk state either by NACS administrators or as the result of a scheduled action.

If the authentication is unsuccessful, the NACS instructs the RAD to reject the user and the connection is disallowed. If the client host is scanned and fails to comply with the scan policy, the NAF is maintained and the client is forced to remain in a restricted network environment, where they can access scan results and optionally self-remediate and get rescanned. They may also log off the network to self-remediate, then log back on and rescan. The NACS detects clients that have disconnected and resets the NAF settings for subsequent connections.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A system for out-of-band control of network access supporting multiple connections comprising:

a network comprising a server device, at least one terminal device, and a communication link between them;
at least one remote access device (RAD) comprising memory, and communicatively coupled to said network; and
a Network Access Control Server (NACS) comprising memory, controlling said network access, wherein said network access control is out of band and comprises:
identity management of said connections;
endpoint compliance of said connections; and
usage policy enforcement of said connections;
wherein said enforcement is out of band and is accomplished on said RAD, comprising communicating with said RAD to make real-time changes to its running configuration, whereby said enforcement is vendor-independent and said system is RAD-agnostic;
said network access control comprising receiving a connect attempt to said network from a user device;
said RAD authenticating connecting user to said NACS for said out of band network control;
said NACS capturing RAD identification, location;
restricting access to said network by said user device with a network access filter (NAF) configured on said RAD;
said RAD directing said client device to an agent;
on said user device, running said agent;
said agent identifying client to said NACS;
modifying said NAF based on compliance; and
monitoring post-connection of successful connections.

2. The system of claim 1, wherein said network access comprises agents whereby said agents collect identity and health information about user and said RAD.

3. The system of claim 1, wherein said network access comprises:
a VPN concentrator that is said RAD;
at least one of a, Remote Access Server (RAS), firewall, intrusion protection detection system, a switch, a router, an authentication authorization and accounting (AAA) directory server, Bootstrap Protocol (BOOTP), Dynamic Host Configuration Protocol (DHCP), and Domain Name System (DNS).

4. The system of claim 1, wherein said network access comprises a connection attempt comprising constructing a connection model from information about user and said RAD.

5. The system of claim 1, wherein said network access control is RAD agnostic and said connections comprise at least one network capable connecting user device.

6. The system of claim 1, wherein identity management comprises role management, wherein users are assigned roles corresponding to access control characteristics specific to each said RAD in said network.

7. The system of claim 1, wherein identity management comprises scan policy based on identity and location of connecting user and said RAD.

8. The system of claim 5, wherein said network access of said connecting user device is controlled by filters based on identity and location of connecting user and said RAD.

9. The system of claim 1, wherein network address of said RAD is unchanged as security condition of said RAD changes, whereby transition between restricted and unrestricted is automatic to said user.

10. The system of claim 1, wherein said usage policy enforcement comprises data recording whereby security threat analysis and regulatory compliance reports are generated, and at-risk device access comprises an automatic remediation option.

11. A method for out of band control for secure network access of a user device to a network comprising the steps of:
receiving a connect attempt to said network from said user device;
authenticating connecting user to a network access control server (NACS) by a remote access device (RAD) for out of band network control;
capturing RAD identification, location by said NACS;
providing out of band network enforcement comprising restricting access to said network by said user device with a network access filter (NAF) configured on said RAD; wherein said enforcement is out of band and is accomplished on said RAD, comprising communicating with said RAD to make real-time changes to its running configuration, whereby said enforcement is vendor-independent and said system is RAD-agnostic;
directing said client device to an agent by said RAD;
running said agent on said user device;
identifying client to said NACS by said agent;
modifying said NAF based on compliance;
monitoring post-connection of successful connections.

12. The method of claim 11, wherein said authenticating step comprises an authentication authorization and accounting (AAA) server.

13. The method of claim 11, wherein said NACS instructs said RAD to reject user and network connection is disallowed when authentication fails.

14. The method of claim 11, wherein said step of restricting access follows successful authentication.

15. The method of claim 14, wherein said step of running said agent comprises scanning by scan policy based on user and location.

16. The system of claim 14, wherein identity management comprises constructing a model of said connecting user device from data gathered by said agent.

17. The method of claim 14, wherein said step of modifying said NAF comprises maintaining said NAF whereby network access is restricted if results from said scanning fail compliance.

18. The method of claim 14, wherein said step of modifying said NAF comprises client remediation when results from said scanning fail compliance.

19. The method of claim 11, wherein said step of modifying said NAF comprises said NACS instructing said RAD to modify said NAF; and
wherein said NAF comprises dynamically applied firewall rules based on assigned IP network address.

20. The method of claim 11, wherein said step of identifying client includes information about user and said user device.

21. The method of claim 11, wherein said step of monitoring post-connection of successful connections comprises continued access, designating client marked at-risk, disabling, or disconnecting based on results of said monitoring wherein said monitoring is passive.

22. A method for out of band control for secure network access of a user device to a network comprising the steps of:
attempting to connect to said network from said user device;
authenticating connecting user to a network access control server (NACS) by a remote access device (RAD), wherein said authentication process is out of band, and not involved in ongoing network traffic flow, whereby data throughput and remote access scalability are unimpeded;

capturing RAD identification, location by said NACS, wherein role-mapping based on user identity and RAD provides identity-based network assignment;

providing out of band enforcement comprising restricting access to said network by said user device with a network access filter (NAF) configured on said RAD, wherein network access restrictions by filter are abstracted whereby a plurality of RAD filtering mechanisms are supported; and wherein said enforcement is out of band and is accomplished on said RAD, comprising communicating with said RAD to make real-time changes to its running configuration, whereby said enforcement is vendor-independent and said system is RAD-agnostic;

directing said client device to an agent by said RAD, wherein said agent is determined by said NACS;

running said agent on said user device, wherein said agent is selected from persistent and dissolvable agents;

identifying client to said NACS by said agent;

modifying said NAF based on compliance; and monitoring post-connection of successful connections.

* * * * *